United States Patent [19]

Takashima

[11] Patent Number: 5,040,581
[45] Date of Patent: Aug. 20, 1991

[54] HARDWOOD FLOOR CUTTING AND LACING APPARATUS

[76] Inventor: Robert S. Takashima, 11949 Courtleigh Dr., Los Angeles, Calif. 90066

[21] Appl. No.: 623,700

[22] Filed: Dec. 7, 1990

[51] Int. Cl.$^5$ .............................. B27C 5/10
[52] U.S. Cl. .................. 144/144.5 R; 144/134 D; 144/144.5 GT; 144/371; 144/372; 409/130; 409/175
[58] Field of Search ............... 144/27, 134 R, 134 D, 144/136 C, 144 R, 144.5, 144.5 GT, 371, 372, 133 R; 409/125, 130, 182, 175; 33/197, 201

[56] References Cited

U.S. PATENT DOCUMENTS

| | | | |
|---|---|---|---|
| 2,957,507 | 10/1960 | Vargo | 144/144.5 |
| 3,450,001 | 6/1969 | Fortune . | |
| 3,782,431 | 1/1974 | Cox . | |
| 4,553,336 | 11/1985 | Ponce | 144/144.5 |
| 4,565,228 | 1/1986 | Ponce | 144/144.5 GT |
| 4,770,216 | 9/1988 | Ruscak . | |
| 4,905,745 | 3/1990 | Jaeger . | |

Primary Examiner—W. Donald Bray
Attorney, Agent, or Firm—Henderson & Sturm

[57] ABSTRACT

A jig or frame with a pair of reference pins adjustably attached thereto so that a pointed bottom of the pin can be positioned in a crack between two pieces of hardwood floor strips. A router is slidably attached to the jig or frame and an adjustable stop is provided for limiting the distance that the router can be moved back and forth. This distance is typically adjusted so that it will move only the width of a hardwood strip and the router is positioned so that the bit thereof can move only from one edge of a hardwood strip to the other edge of the hardwood strip when the reference pins are set in the crack between such hardwood strip and the next adjacent hardwood strip.

7 Claims, 1 Drawing Sheet

HARDWOOD FLOOR CUTTING AND LACING APPARATUS

TECHNICAL FIELD

The present invention relates generally to an apparatus for cutting hardwood flooring strips and more particularly to an adjustable jig for guiding a router to cut hardwood flooring strips while they are still attached to floorboards so that a portion of the hardwood floor can be replaced.

BACKGROUND ART

It occasionally happens that a portion of the hardwood floor becomes damaged, for example by termites or from animal stains such as from urine or excrement from a pet dog or cat. The conventional way of removing a portion of such damaged hardwood floor so it can be replaced is to use a hammer and chisel to cut out those strips of hardwood which need to be removed and then to cut new replacement hardwood strips. This is a long and tedious task and it becomes difficult to make a good clean and straight cut across the hardwood strip with a hammer and chisel, and furthermore this task is tiring and time-consuming.

Accordingly, there is a need for an apparatus which will overcome the aforementioned problems with removing hardwood strips from the damaged portion of a hardwood floor so that they can be replaced.

DISCLOSURE OF THE INVENTION

The present invention includes a jig or frame with a pair of reference pins adjustably attached thereto so that a pointed bottom of the pin can be positioned in a crack between two pieces of hardwood floor strips. A router is slidably attached to the jig or frame and an adjustable stop is provided for limiting the distance that the router can be moved back and forth. This distance is typically adjusted so that it will move only the width of a hardwood strip and the router is positioned so that the bit thereof can move only from one edge of a hardwood strip to the other edge of the hardwood strip when the reference pins are set in the crack between such hardwood strip and the next adjacent hardwood strip.

An object of the present invention is to provide an apparatus for cutting hardwood strips from a hardwood floor so that damaged portions thereof can be removed and replaced.

A further object of the present invention is to provide an apparatus of the aforementioned type which includes a jig with reference pins which can be placed in a crack between two hardwood strips to position the router bit at one position and a slidable mounting permits the router and bit to slide to another position which can be adjusted to be the width of a hardwood strip in a hardwood floor.

A still further object of the present invention is to provide an apparatus of the aforementioned type which is economical to produce, easy and quick to use and is dependable.

Other objects, advantages, and novel features of the present invention will become apparent from the following detailed description of the invention when considered in conjunction with the accompanying drawings.

BEST MODE FOR CARRYING OUT THE INVENTION

Figure 1:
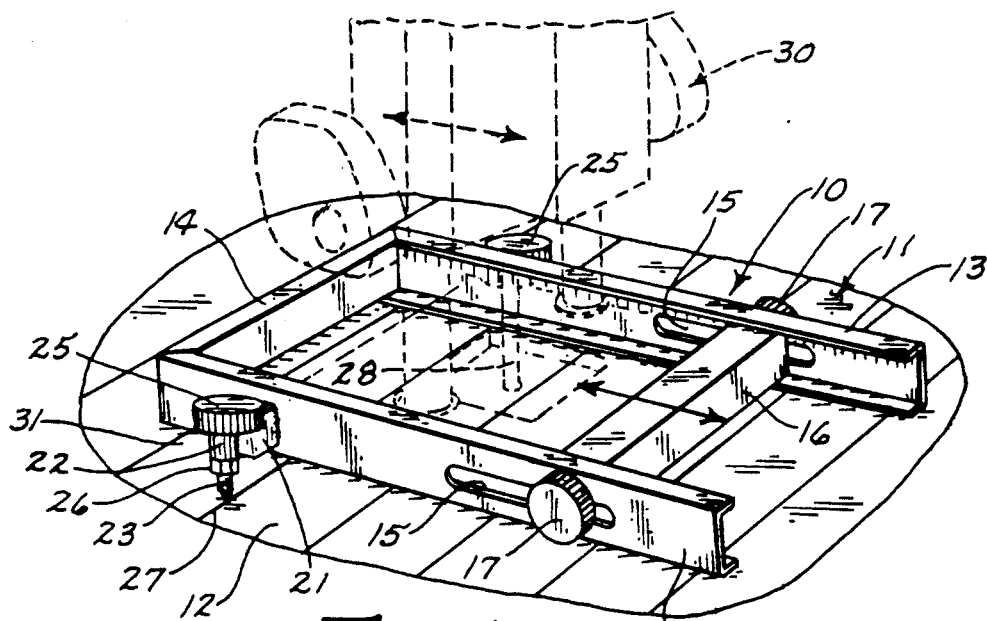
FIG. 1 is a perspective view of the apparatus of the present invention shown in solid lines and showing a router in dashed lines which is slideably attached to the jig apparatus.
Figure 2:
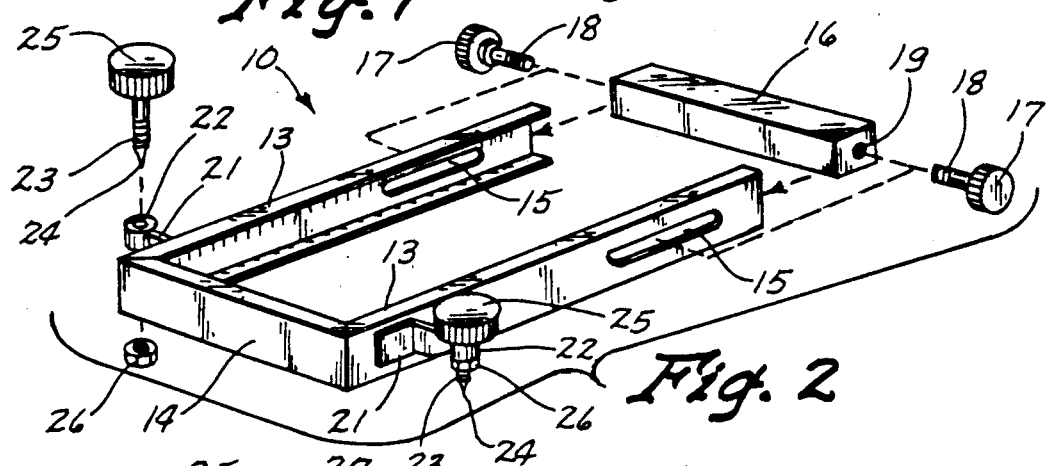
FIG. 2 is an exploded perspective view of the jig apparatus of the present invention.

Referring now to the drawings wherein like reference numerals designate identical or corresponding parts throughout the several views, FIG. 1 shows a jig apparatus (10) in position over a hardwood floor (11) to cut a hardwood strip (12) so that it can be removed for replacement purposes.

The jig or frame (10) includes a pair of metal beams (13) which are generally C-shaped in configuration and are connected together at one end by welding to a metal member (14). These C-shaped beams (13) have a pair of posed slots (15) therein so that the position of a stop member (16) can be adjusted.

Adjustment knobs (17) have threaded ends (18) thereon which extend into threaded openings (19) in the stop (16). Flanges (21) have threaded openings (22) therein for threadably receiving threaded rod (23) which has a conically pointed end (24) thereon and a knurled handle (25) on the other end thereof. Lock nuts (26) can be threaded down to lock the pin (23) in the desired position once the position of point (24) has been adjusted with respect to the frame (23) to the position desired.

Figure 3:
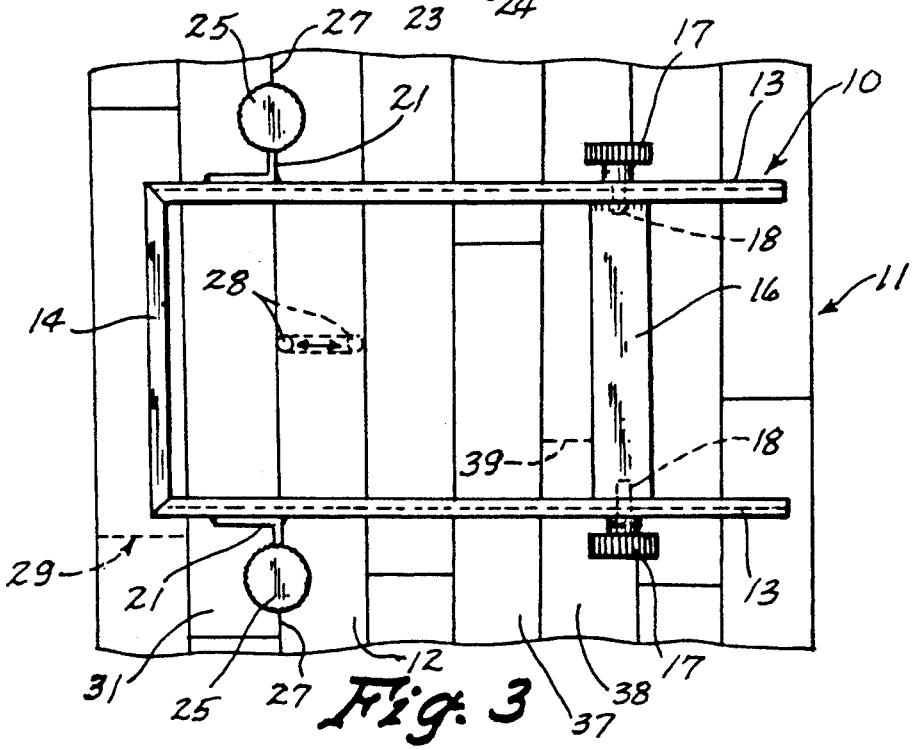
FIG. 3 is a top plan view of the jig apparatus showing the hardwood floor therebeneath and showing the extreme positions of the router bit in solid and dashed lines to cut off one of the hardwood strips.

In operation, the pins (23) are placed in the position shown in FIGS. 1 and 3 and adjusted to the proper height so that when the points (24) extend into a crack (27) between the board (12) and the board (31) the jig or frame (10) essentially rests on the hardwood strips.

The router (30) is has edge portions which slide into the side grooves of channel (13) so that the router (30) will move in the direction of the dashed arrow in the upper portion of FIG. 1 but it will be guided so that it cannot twist or turn during this movement with respect to the jig frame (10). Once the router is received within the channels (13), the stop member (16) can be placed in the position shown in FIGS. 1 and 3, and after it is so placed, the knob (17) and bolts (18) are inserted in openings (19) in the ends of stop (16). The stop (16) is then adjusted back and forth in the direction of the arrow immediately thereabove in FIG. 1 so that the extreme positions of the bit (28) will be limited to and between the positions where it is shown in FIG. 3 in solid lines and where it is shown in dashed lines.

Assuming all of the hardwood strips are the same width, this adjustment need only be made once for a certain hardwood floor and the strips can then be quickly and automatically cut.

Once the router (30) and stop (16) have been placed in position and adjusted as described above, the operator of this "lacing" machine merely needs to identify the places to be cut, such as the line between where the router bit (28) is shown in dashed and solid lines in FIG. 3 and, for illustrative purposes only, dashed lines (29) and (39) in FIG. 3.

Once the lower portion of the hardwood floor strip has been cut straight across where the router bit (28) is shown in FIG. 3, the lower portion of strip (12) can be removed for replacement purposes. Similarly, if it is desired to make the cut at dashed line (39) the entire apparatus (10) is merely picked up and moved over so that the pins (23) are placed between the boards or strips (37) and (38) with the router bit (28) in position somewhere on the dashed line (39) so that when the router bit (28) is moved back and/or forth across the line (39), it will cut the strip (38) at the dashed line (39) so that the lower portion as viewed in FIG. 3, for example, can be removed for replacement purposes.

Accordingly, it will be appreciated that the present invention does indeed accomplish the aforementioned objects. Obviously many modifications and variations of the present invention are possible in light of the above teachings. It is therefore to be understood that, within the scope of the appended claims, the invention may be practiced otherwise than as specifically described.

I claim:

1. A lacing apparatus for cutting hardwood floor strips comprising:
   a frame;
   a first reference means operably attached to said frame including a first pin with a narrow lower portion for being positioned at a first point between two pieces of abutting hardwood floor strips;
   a second reference means operably attached to said frame means including second pin with a narrow lower portion for being positioned at a second point between two pieces of abutting hardwood floor strips;
   attachment means associated with said frame for slidably attaching a router to said frame for permitting said router to move only in a direction perpendicular to an imaginary straight line drawn through said first and second points; and
   stop means for adjustably limiting the distance that said router can be moved in said direction whereby the movement of said router can be set to limit movement thereof between two predetermined positions and wherein the distance between said two predetermined positions can be set to correspond to the width of each of said hardwood floor strips.

2. The apparatus of claim 1 wherein said stop means includes a pair of aligned slots in said frame, a stop member disposed between said aligned slots and fasteners extending through said aligned slots and being operably attached to said stop member.

3. The apparatus of claim I wherein said attachment means comprises a pair of opposed grooves in said frame for receiving opposed portions of said router therein.

4. The apparatus of claim 1 wherein said first pin is threaded and is operably threadably engaged with said frame so that the position of narrow lower portion thereof can be adjusted with respect to said frame.

5. The apparatus of claim 4 wherein said narrow lower portion of said first pin is conically shaped.

6. The apparatus of claim 5 wherein said second pin is threaded and is operably threadably engaged with said frame so that the position of narrow lower portion thereof can be adjusted with respect to said frame.

7. The apparatus of claim 6 wherein said narrow lower portion of said second pin is conically shaped.

* * * * *